(12) United States Patent
Isgar

(10) Patent No.: US 11,409,366 B2
(45) Date of Patent: Aug. 9, 2022

(54) GESTURE-BASED DEVICE ACTIVATION SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

(21) Appl. No.: 17/062,770

(22) Filed: Oct. 5, 2020

(65) Prior Publication Data

US 2021/0103339 A1 Apr. 8, 2021

Related U.S. Application Data

(60) Provisional application No. 62/910,415, filed on Oct. 3, 2019.

(51) Int. Cl.
*G06F 3/01* (2006.01)

(52) U.S. Cl.
CPC .................................... *G06F 3/017* (2013.01)

(58) Field of Classification Search
CPC ................................ G06F 3/017; G06F 3/0346
See application file for complete search history.

(56) References Cited

U.S. PATENT DOCUMENTS

| | | | | |
|---|---|---|---|---|
| 9,410,809 | B2* | 8/2016 | Hogdal | G01C 21/20 |
| 9,726,498 | B2* | 8/2017 | Meduna | G01C 21/3423 |
| 9,904,444 | B2* | 2/2018 | Cho | G06F 3/04842 |
| 9,921,335 | B1* | 3/2018 | Keal | G06F 1/1694 |
| 10,078,372 | B2* | 9/2018 | Chen | H04M 1/72454 |
| 2004/0169674 | A1* | 9/2004 | Linjama | G06F 1/1626 |
| | | | | 715/702 |
| 2005/0210417 | A1* | 9/2005 | Marvit | G06F 3/017 |
| | | | | 715/863 |
| 2005/0216867 | A1* | 9/2005 | Marvit | G06F 1/1694 |
| | | | | 715/863 |
| 2007/0176898 | A1* | 8/2007 | Suh | G06F 1/1616 |
| | | | | 345/158 |
| 2007/0259717 | A1* | 11/2007 | Mattice | G07F 17/32 |
| | | | | 463/36 |
| 2007/0268246 | A1* | 11/2007 | Hyatt | G06F 1/1694 |
| | | | | 345/156 |
| 2008/0134784 | A1* | 6/2008 | Jeng | G06F 3/0346 |
| | | | | 73/514.01 |
| 2008/0254822 | A1* | 10/2008 | Tilley | G06F 1/1684 |
| | | | | 455/550.1 |
| 2009/0051648 | A1* | 2/2009 | Shamaie | G06F 3/0346 |
| | | | | 345/156 |

(Continued)

OTHER PUBLICATIONS

Isgar, Charles, Gesture-Based Device Activation System, Patent Cooperation Treaty Application Serial No. PCT/US21/53469, filed on Oct. 5, 2021, International Search Report and Written Opinion dated Oct. 29, 2021.

*Primary Examiner* — Grant Sitta

(74) *Attorney, Agent, or Firm* — Schmeiser, Olsen & Watts LLP

(57) ABSTRACT

A gesture-based device activation system is provided. The system may include a user computing device and a gesture application operable on the user computing device. The system may operate to allow the user computing device to capture gestures performed by a user, wherein the gestures are associated with user selected device functionality. The gestures performed by the user result in operation of the user computing device in accordance with the gestures and functions previously entered and stored by the user.

6 Claims, 8 Drawing Sheets

(56) References Cited

U.S. PATENT DOCUMENTS

| | | | | |
|---|---|---|---|---|
| 2012/0007713 | A1* | 1/2012 | Nasiri | A63F 13/30 340/5.81 |
| 2012/0179965 | A1* | 7/2012 | Taylor | G06F 3/0346 715/705 |
| 2013/0162525 | A1* | 6/2013 | Ye | G06F 1/1694 345/156 |
| 2014/0101610 | A1* | 4/2014 | Zhang | G06F 3/0488 715/810 |
| 2014/0204017 | A1* | 7/2014 | Wu | G06F 1/3215 345/156 |
| 2015/0372810 | A1* | 12/2015 | Miller | H04L 9/0822 713/183 |
| 2016/0047669 | A1* | 2/2016 | Delaye | G06F 16/29 701/533 |
| 2016/0054808 | A1* | 2/2016 | Cho | G06F 3/0484 345/156 |
| 2016/0092504 | A1* | 3/2016 | Mitri | G06F 3/011 707/737 |
| 2016/0103538 | A1* | 4/2016 | Cheng | G06F 3/0412 345/173 |
| 2019/0268771 | A1* | 8/2019 | Seo | H04N 5/232 |
| 2020/0225825 | A1* | 7/2020 | Dong | G06Q 50/01 |

* cited by examiner

GESTURE-BASED DEVICE ACTIVATION SYSTEM

CROSS REFERENCE TO RELATED APPLICATION

This application claims priority to U.S. Provisional patent application to Charles Isgar entitled "GESTURE-BASED DEVICE ACTIVATION SYSTEM," Ser. No. 62/910,415, filed Oct. 3, 2019, the disclosure of which is hereby incorporated entirely herein by reference.

BACKGROUND OF THE INVENTION

Technical Field

This invention relates generally to an activation system to activate functions of a user computing device, and more particularly to a system for storing user-defined gestures for activation of corresponding device functions.

State of the Art

User computing devices such as smartphones and tablets are commonplace among the general population. Wireless companies almost only provide for smartphones as opposed to other cell phone options. Additionally, many people are opting to utilize tablets as their sole computing device because of the portability and processing power associated with ease of carrying such a device. As these devices continue in popularity, many different apps have been and will continue to be developed that require certain user interactions with the touchscreen of the device to perform certain functions on the user computing device. Current protocols limit access to certain biometric input and lack the ability to provide other functionality associated with the desired function of the user computing device.

Accordingly, there is a need for a system for gesture-based activation as a function of a user computing device.

SUMMARY OF THE INVENTION

An embodiment includes a gesture-based device activation system comprising: a user computing device; and a gesture application operable on the user computing device, wherein the gesture application may be selected to run on the user computing device or configured to run in a background at all times, wherein the gesture application, when active, monitors gesture entry by a user; and the application programmed to receive, from the user, an input gesture command, wherein the input gesture command is performed by the user of the user computing device; automatically process the input gesture command and access a gesture database and retrieve gesture information stored in the gesture database including stored gesture commands; automatically compare the input gesture command with stored gesture commands and determine a match between the input gesture command and one stored gesture command; and automatically execute a function associated with the one stored gesture command.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a gesture-based device activation system that provides for gesture control of functionality of a user device, such as a smartphone or a tablet. For many users, it may be more of an ease and preference of use to gesture with a device than to engage a screen of the device. Such a system also provides for a safer and friendlier use of device functionality depending on the situation. Embodiments of the system may be customizable for the type and style of gestures for each person. With devices becoming lighter and more powerful, this system will be able to benefit from greater ease and accuracy to use a device in air gesturing to activate device functionality.

Figure 1:
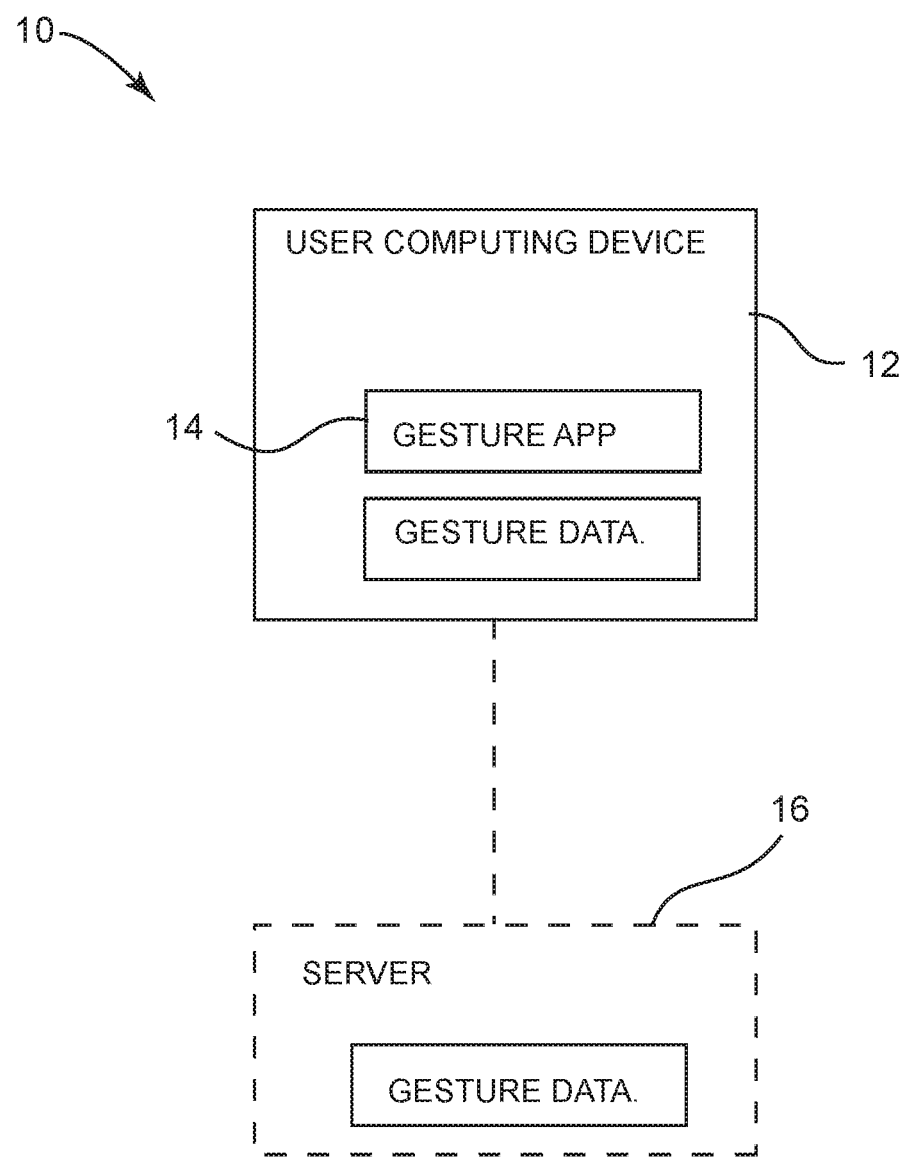
FIG. 1 is a diagrammatic view of a gesture-based device activation system in accordance with an embodiment.
Figure 2:
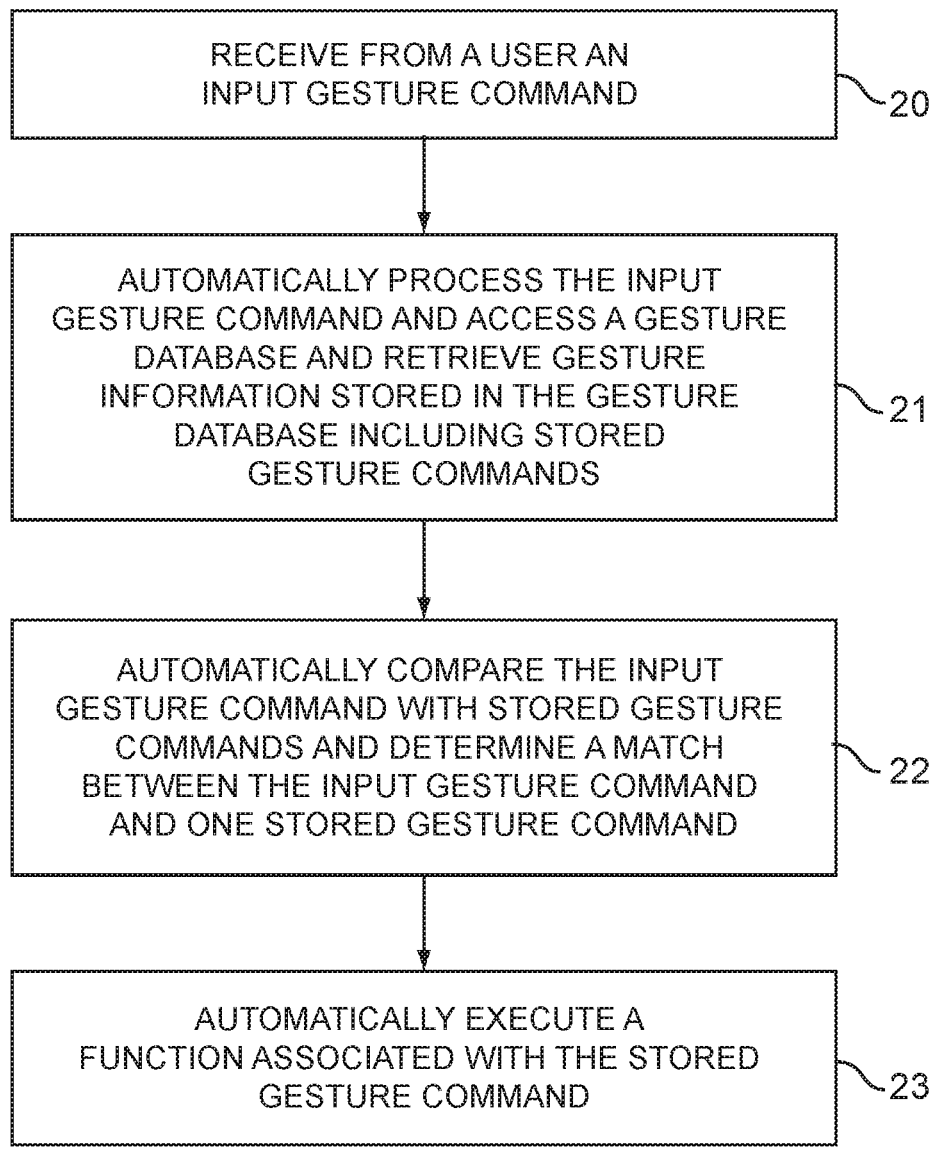
FIG. 2 is a flow chart of programmed steps of a gesture-based device activation system in accordance with an embodiment.

Referring to the drawings, FIG. 1 depicts an embodiment of a gesture-based device activation system 10. The system 10 may include user computing devices 12, operating a gesture-control application 14, and optionally, it may include a server 14. In embodiments with a server, the system may include the user computing device 12 coupled to the server 16, wherein this coupling may be a network connection, such as through an Internet connection, wherein the user computing device 12 and the server 16 may communicate with each other.

In embodiments, the user device may be, without limitation, a smartphone, a tablet, a smart accessory coupled to a smartphone or tablet, or other type of portable computing device.

The user computing device 12 may include a memory storing gesture information corresponding to various functions of the user computing device. Such functions may include, but are not limited to activating a phone call application and initiating a phone call, starting a camera app and taking a photo, initiating a payment app, activating any function of the user device, starting an app on the device and executing certain functionality of that app. The gesture information is user-defined, wherein the user can perform a gesture and associate the gesture with a user-selected device function, wherein the stored gesture is a stored gesture command. This may be repeated for every user-defined gesture and associated device function to form a plurality of stored gesture commands. This information may be stored in the memory in a gesture database for later recall and operation.

The user device 12 may include a gesture application operable on the device, wherein the gesture application may be selected to run on the device or may be configured to run in the background at all times, wherein the gesture application, when active, monitors gesture entry by the user. The application may be programmed to: receive, from a user, an input gesture command (Step 20), wherein the input gesture command is performed by a user of the user computing device; automatically process the input gesture command, access a gesture database, and retrieve gesture information stored in the gesture database, including stored gesture commands (Step 21); automatically compare the input gesture command with stored gesture commands and determine a match between the input gesture command and one stored gesture command (Step 22); and automatically execute a function associated with the one stored gesture command (Step 23).

The gestures that a user may program can be accomplished in various ways. For example, the gestures may be gestures performed by a user wherein the user device 12 may be moved to create the gestures, a gesture of a wearable or other smart device, or the like. In embodiments, various gesture methods may be employed on the same user computing device 12 in order to associate it with particular functions.

Figure 3:
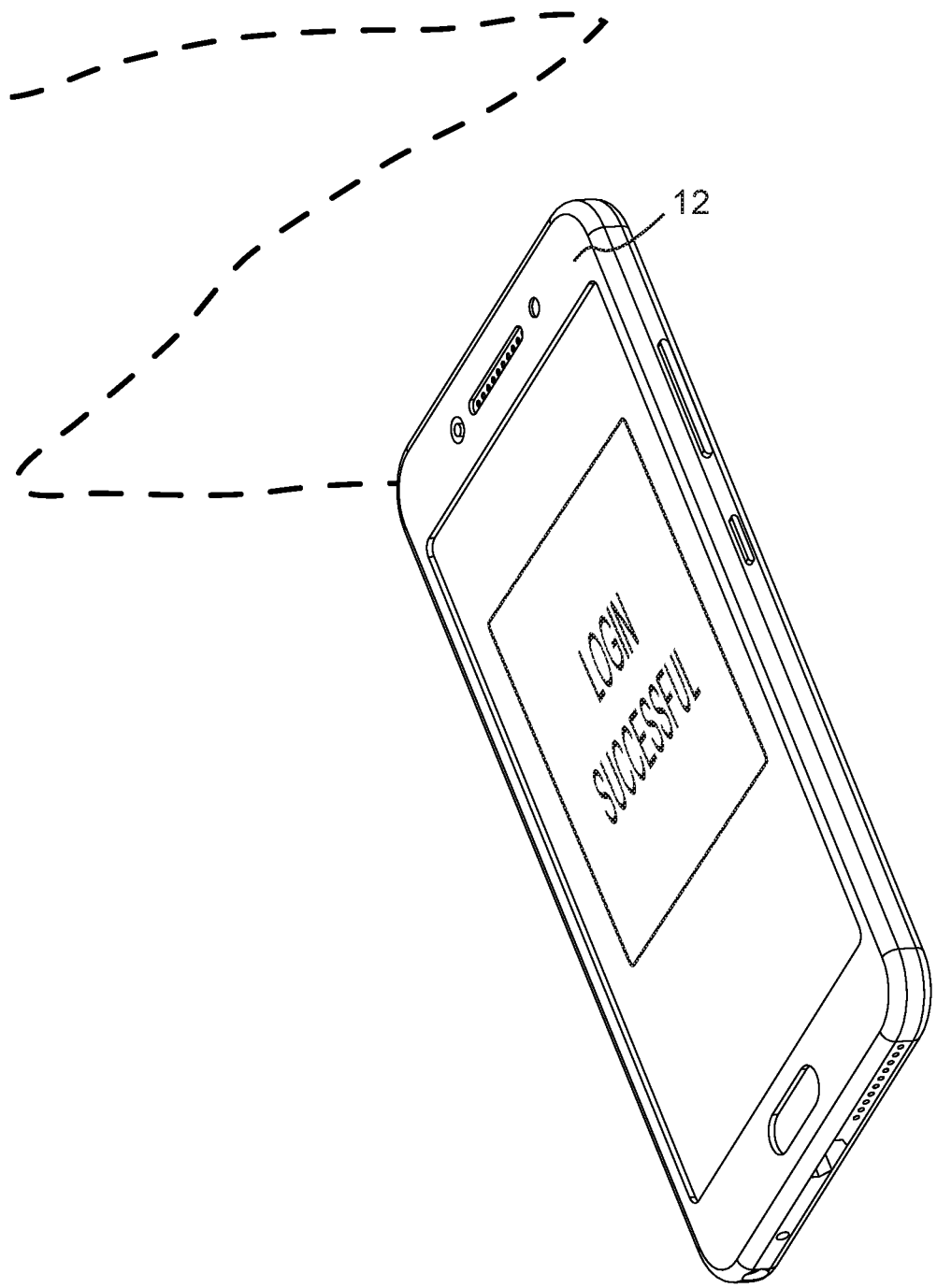
FIG. 3 is a view of a user computing device performing gestured-based activation in accordance with an embodiment.
Figure 4:
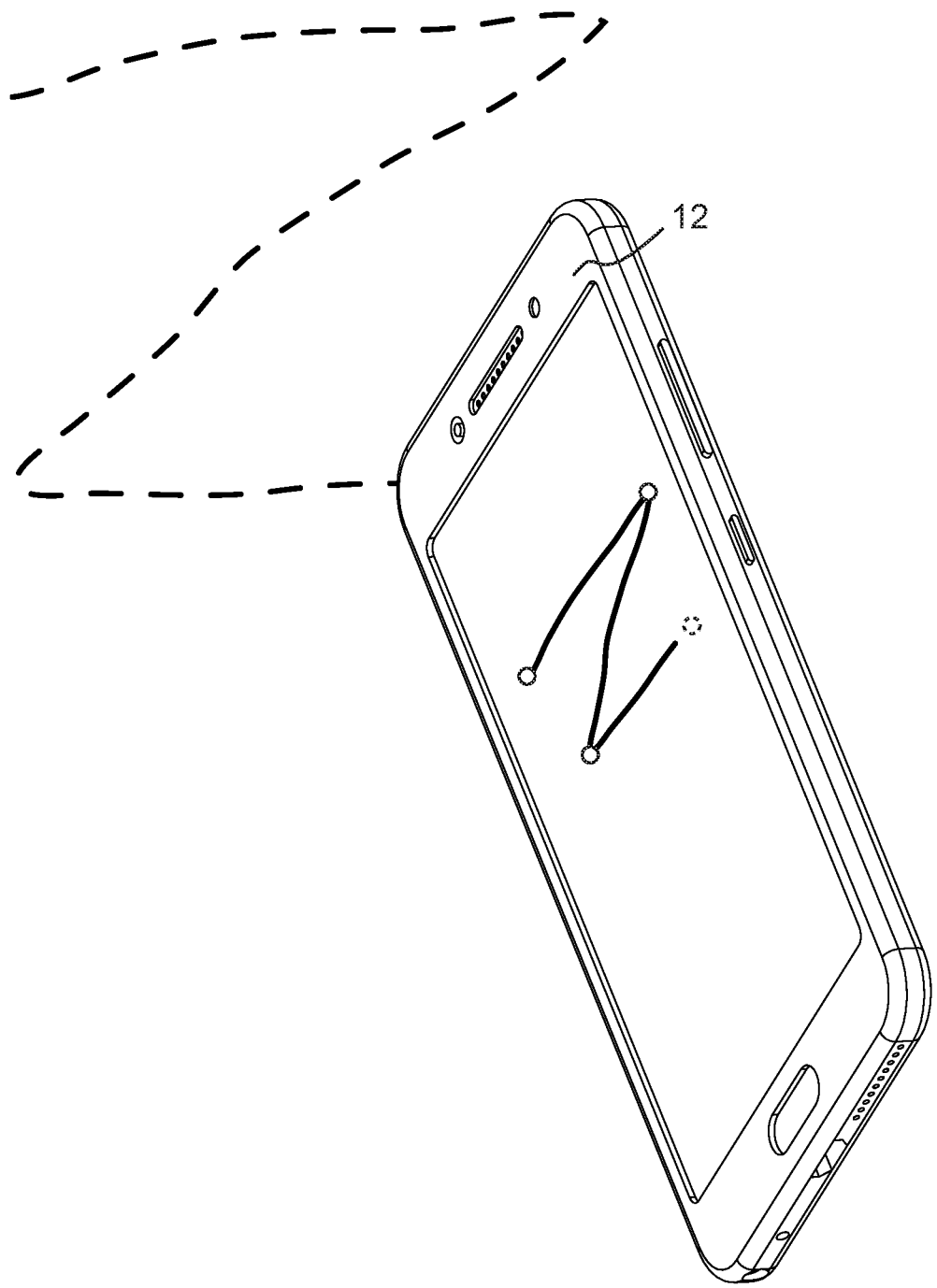
FIG. 4 is a view of a user computing device performing gestured-based activation in accordance with an embodiment.
Figure 5:
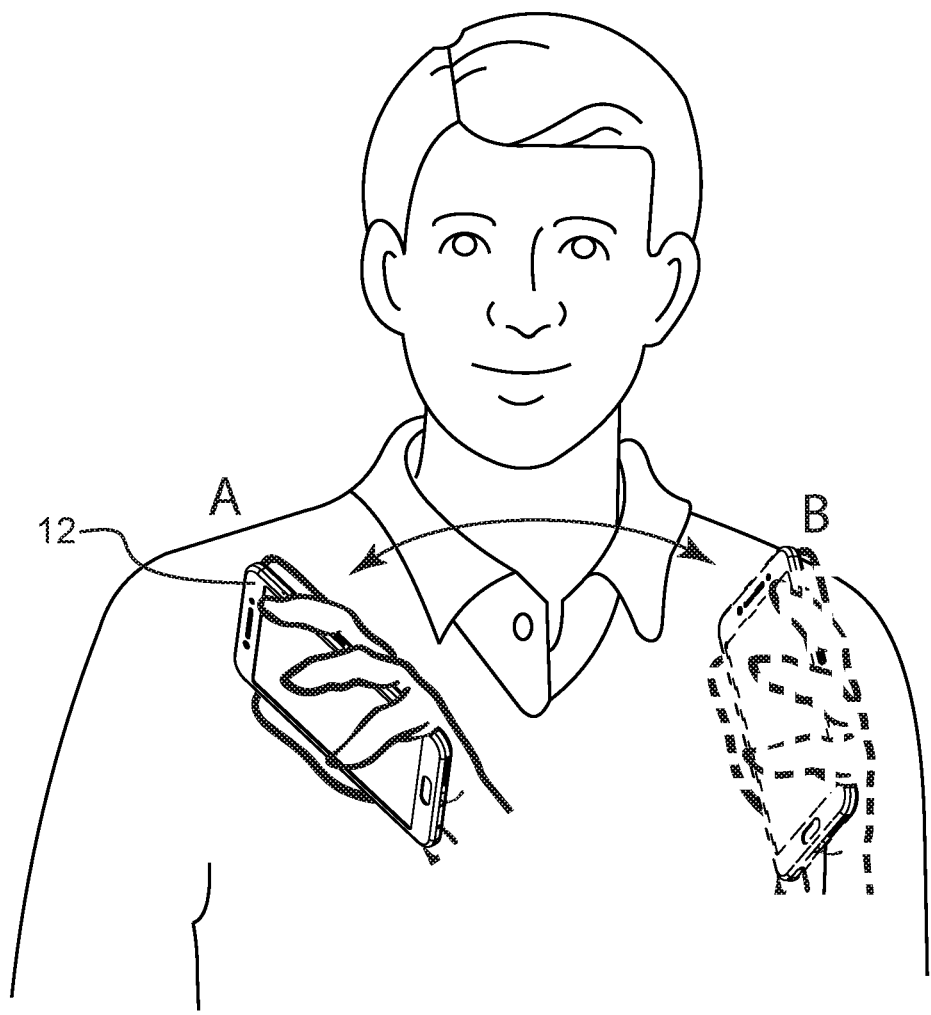
FIG. 5 is a view of a user computing device performing gestured-based activation in accordance with an embodiment.
Figure 6:
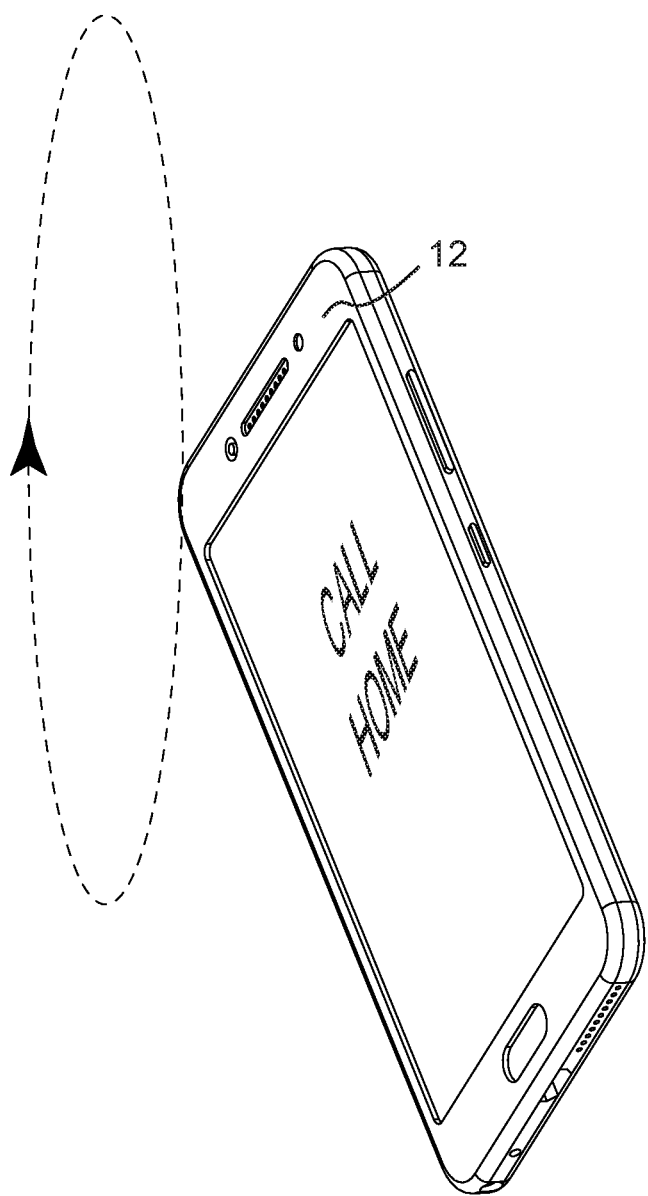
FIG. 6 is a view of a user computing device performing gestured-based activation in accordance with an embodiment.
Figure 7:
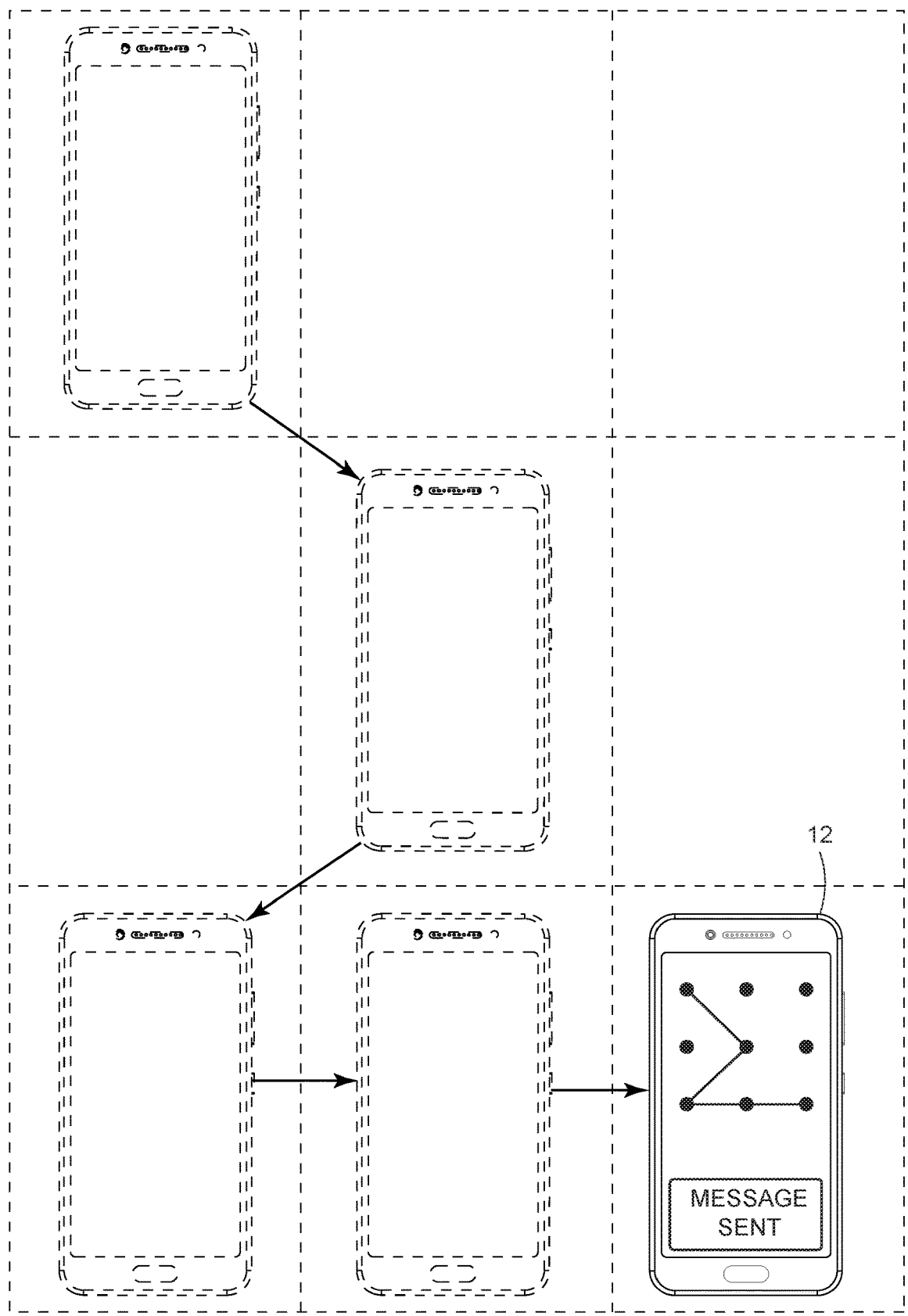
FIG. 7 is a view of a user computing device performing gestured-based activation in accordance with an embodiment.
Figure 8:
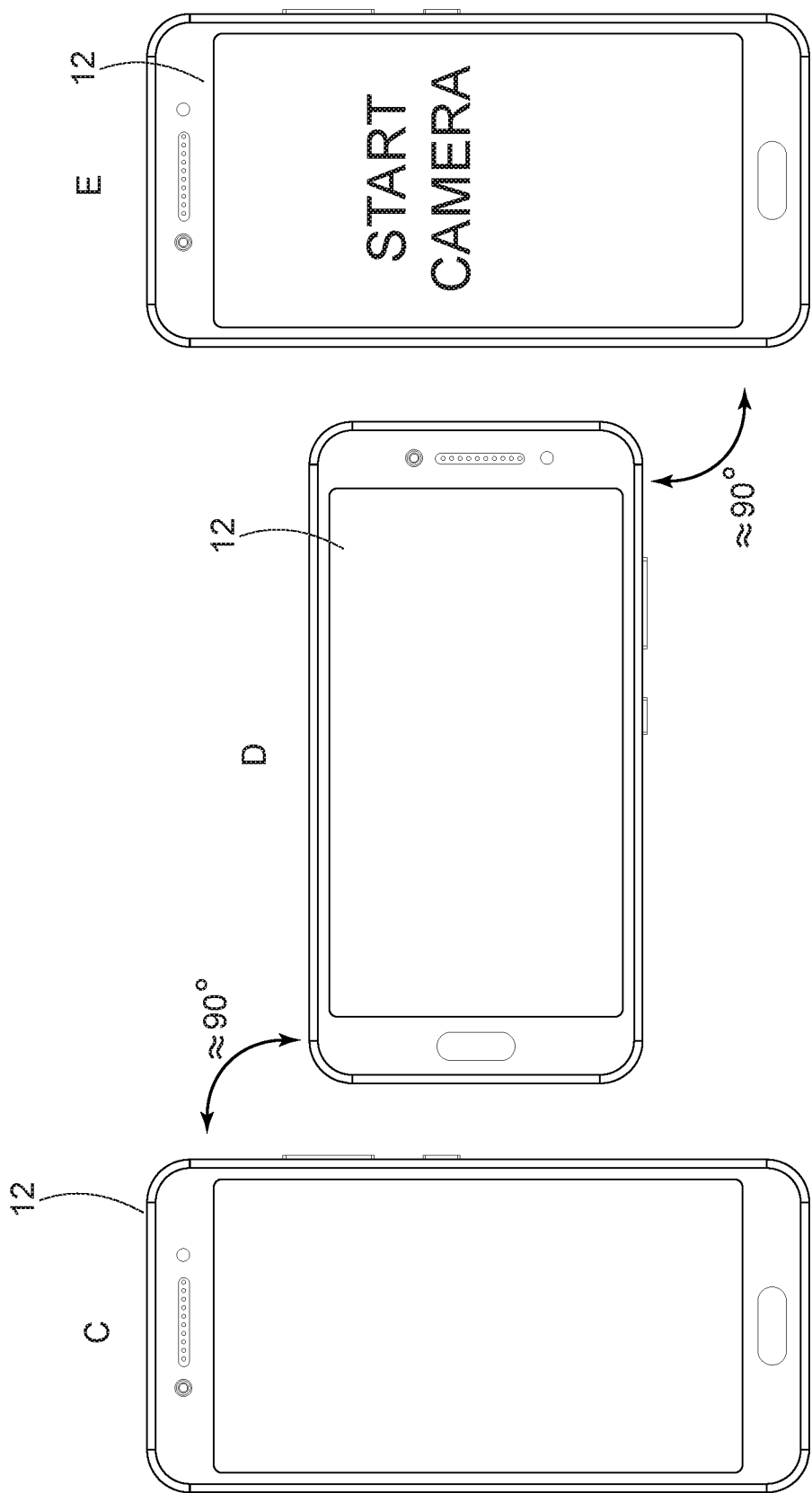
FIG. 8 is a view of a user computing device performing gestured-based activation in accordance with an embodiment.

By way of example of various gestures, and not as a limitation, the following are examples of gestures that a user can do:

a. Write a letter in the air that is captured by the device 12 (see FIG. 3);

b. Make a set pattern in the air that is captured by the device 12 (See FIGS. 3, 4 and 6), wherein the pattern may be a letter, a user-defined path such as a zig-zag, a circle that may be repeated one or more times, or any other pattern determined by the user;

c. Draw a letter or pattern on a surface with one part of the phone, the movement of the device 12 being captured by the device 12 (FIG. 3 depicts an example of the motion that can be applied to a surface instead of in the air);

d. Tap or accelerate the phone in a certain repeatable path that is captured by the device 12;

e. Toss the device 12 a user-defined amount of times that is captured by the device 12;

f. Move the device from a portrait position (position C) to a landscape position (position D) and back to a portrait position (position E) any number of times as determined by the user, as depicted in FIG. 8;

g. Move device 12 around part of the user's body or object in a user-defined pattern that is captured by the device 12, such as from one shoulder identified as position A in FIG. 5 to the other shoulder identified as position B ins FIG. 5;

h. Move device in a user-defined pattern associated with a grid pattern of phone security that is captured by the device 12 (See FIG. 7);

i. Turn device 12 upside down and back, or the like, that is captured by the device 12;

j. Write a user-defined figure, such as a letter, like "z", in the air and the device 12 screen shows the tracing of the figure like the letter "z" and confirms it is the user engaging the device 12, wherein the device operates like an in-air etch-a-sketch that is captured by the device 12 (See FIG. 4);

k. Move the device 12 in a toss motion in a user-selected direction, wherein each direction operates a different function;

l. Move device 12 wherein a scale is depicted on a screen of the device 12, thereby allowing the user to select numbers or degrees on the scale depicted on the screen while the user moves the device 12, wherein the selected numbers or degrees are captured by the device 12;

m. Draw a user signature in the air that is captured by the device 12 (similar to FIGS. 3 and 4);

n. Possible restriction of the device 12 to only be able to receive gestures, such as drawing gestures in the air when thumbprint or another authorizing means authorizes the device to engage air gesture captures;

o. Device 12 may be coupled with AR/VR devices so the user can use his or her device as a pointer or tool to engage the AR/VR space;

p. Slam device 12 (maybe a predetermined number of times) to engage a function, such as to call 911 and turn speaker on;

q. Change elevation of device 12 relative to user's body to engage functionality;

r. Change proximity of device 12 with a wearable device to engage functionality;

s. Change proximity of device 12 to a metal piece of jewelry or given tab/clip to provide proximity sensing; and t. Use phone compass on screen like an old-fashioned combination lock, or display an image of combination lock that allows a user to perform gestures with the device 12, movement gestures of the user, or the like, to turn the image to engage a selected user code.

The various gestures, as described above, may be stored in association with particular functions. Such functions may include, without limitation, placing a phone call, engaging the camera and operating it, effecting payment from an app, starting an app, sending a text, sending an email, playing a movie, performing certain operations within an app, logging into certain apps that require a password or other key code, and the like.

Embodiments discussed above include operations of the system using just a user computing device 12. As depicted in FIG. 1, there may be systems 10 that utilize a server 16, wherein the gesture database is stored on the server, and the server 16 operates to compare the input gesture captured by the user computing device 12 with the stored gestures and identify the function associated with the input gesture and deliver to the user computing device 12 the instructions to execute on the user computing device 12 to perform the function associated with the captured input gesture.

While certain gestures and device functionality have been shown in the drawing figures and discussed above, it will be understood that this is not a limitation on the scope of the invention. Any number of gestures can be utilized, all of which are determined by the user. Further, any number of device functionality may be associated with the gestures, thereby giving full control over gesture-based activation of device functionality to the user.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A gesture-based device activation system comprising:
    a user computing device; and
    a gesture application operable on the user computing device, wherein the gesture application is selectable to activate and run on the user computing device or configured to run in a background of the device, wherein the gesture application, when active, monitors gesture entry by a user; and the application is programmed to:
receive, from the user, an input gesture command, wherein the input gesture command is performed by the user of the user computing device;
automatically process the input gesture command, access a gesture database, and retrieve gesture information stored in the gesture database including stored gesture commands;
automatically compare the input gesture command with the stored gesture commands and determine a match between the input gesture command and one stored gesture command; and
automatically execute a function associated with the one stored gesture command,
wherein the stored gesture commands are user-defined gesture commands, and wherein the application is further programmed to:
associate the input gesture command with a device function in response to user input to the user computing device; and
store the input gesture command with the associated device function as a user-defined gesture command, wherein the device function comprises:
sending a text, wherein the input gesture command is motion of the user computing device in a user-defined pattern associated with a grid pattern.

2. The system of claim 1 further comprising a server, wherein the gesture database is stored on a memory thereof.

3. A gesture-based device activation system comprising:
a user computing device; and
a gesture application operable on the user computing device, wherein the gesture application is selectable to activate and run on the user computing device or configured to run in a background of the device, wherein the gesture application, when active, monitors gesture entry by a user; and the application is programmed to:
receive, from the user, an input gesture command, wherein the input gesture command is performed by the user of the user computing device;
automatically process the input gesture command, access a gesture database, and retrieve gesture information stored in the gesture database including stored gesture commands;
automatically compare the input gesture command with the stored gesture commands and determine a match between the input gesture command and one stored gesture command; and
automatically execute a function associated with the one stored gesture command, wherein the stored gesture commands are user-defined gesture commands, and wherein the application is further programmed to:
associate the input gesture command with a device function in response to user input to the user computing device; and
store the input gesture command with the associated device function as a user-defined gesture command, wherein the device function comprises:
placing a phone call;
operating a camera of the user computing device;
effecting a payment through an app on the user computing device;
sending a text;
sending an email;
playing a movie; and or logging into the app with a password or key code, wherein the input gesture command is motion of the user computing device from a portrait position to a landscape position to a portrait position.

4. The system of claim 3, further comprising a server, wherein the gesture database is stored on a memory thereof.

5. A gesture-based device activation system comprising:
a user computing device; and
a gesture application operable on the user computing device, wherein the gesture application is selectable to activate and run on the user computing device or configured to run in a background of the device, wherein the gesture application, when active, monitors gesture entry by a user; and the application is programmed to:
receive, from the user, an input gesture command, wherein the input gesture command is performed by the user of the user computing device;
automatically process the input gesture command, access a gesture database, and retrieve gesture information stored in the gesture database including stored gesture commands;
automatically compare the input gesture command with the stored gesture commands and determine a match between the input gesture command and one stored gesture command; and
automatically execute a function associated with the one stored gesture command, wherein the stored gesture commands are user-defined gesture commands, and wherein the application is further programmed to:
associate the input gesture command with a device function in response to user input to the user computing device; and
store the input gesture command with the associated device function as a user-defined gesture command, wherein the device function comprises:
operating a camera of the user computing device, wherein the input gesture command is motion of the user computing device from a portrait position to a landscape position to a portrait position.

6. The system of claim 5, further comprising a server, wherein the gesture database is stored on a memory thereof.

* * * * *